United States Patent [19]

Schauer

[11] 4,019,404
[45] Apr. 26, 1977

[54] POWER TRANSMISSION
[75] Inventor: George A. Schauer, Ames, Iowa
[73] Assignee: Sundstrand Corporation, Rockford, Ill.
[22] Filed: Mar. 21, 1975
[21] Appl. No.: 560,998
[52] U.S. Cl. .................. 74/687; 74/720.5; 60/437
[51] Int. Cl.$^2$ ...................... F16H 47/04
[58] Field of Search ............ 74/687, 688, 18, 733, 74/337.5, 720, 720.5; 60/435, 437

[56] References Cited
UNITED STATES PATENTS

| | | | |
|---|---|---|---|
| 2,929,269 | 3/1960 | Woydt | 74/687 |
| 3,055,233 | 9/1962 | Giles | 74/687 |
| 3,203,276 | 8/1965 | Bullard | 74/687 |
| 3,293,943 | 12/1966 | MacDonald | 74/687 |
| 3,383,952 | 5/1968 | Christenson | 74/687 X |
| 3,427,899 | 2/1969 | Gunderson et al. | 74/687 |
| 3,433,095 | 3/1969 | Tuck | 74/687 |
| 3,470,769 | 10/1969 | Livezey | 74/687 X |
| 3,488,947 | 1/1970 | Miller et al. | 74/687 X |
| 3,496,803 | 2/1970 | Whelahan | 74/687 X |
| 3,596,535 | 8/1971 | Polak | 74/687 X |
| 3,626,787 | 12/1971 | Singer | 74/687 |
| 3,714,846 | 2/1973 | Louis et al. | 74/687 |
| 3,744,344 | 7/1973 | Olsen et al. | 74/687 |

Primary Examiner—Edgar W. Geoghegan
Attorney, Agent, or Firm—Wegner, Stellman, McCord, Wiles & Wood

[57] ABSTRACT

A power transmission having both mechanical and hydraulic power paths to a simple planetary differential unit to provide a double hydro-hydromechanical transmission with a low-speed, high torque, hydrostatic drive range by causing counterrotation of two gear members of the simple planetary, an intermediate speed range hydromechanical drive with inputs to the differential from both power paths and a high-speed, hydrostatic drive range.

21 Claims, 8 Drawing Figures

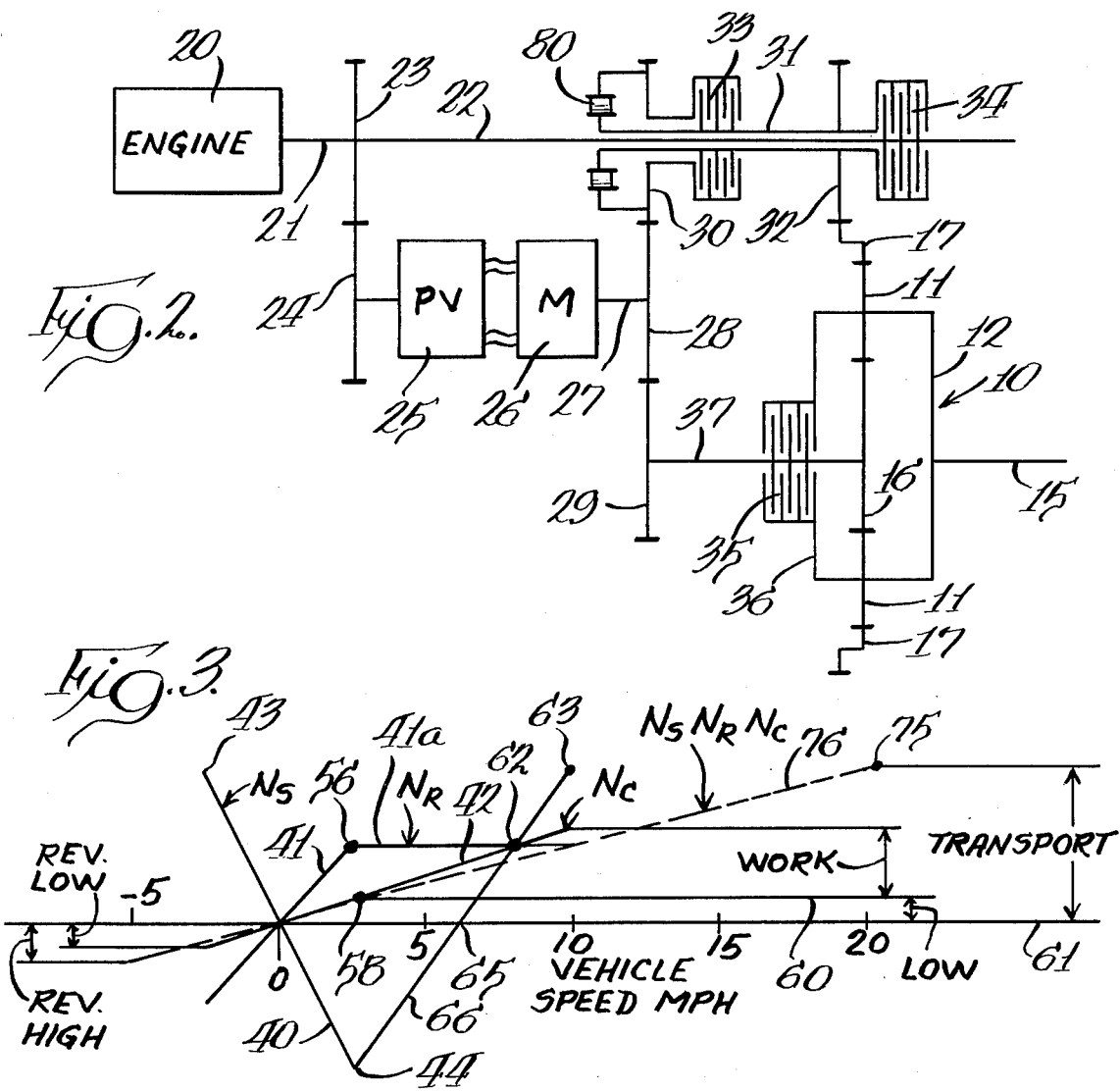
Fig. 2.
Fig. 3.
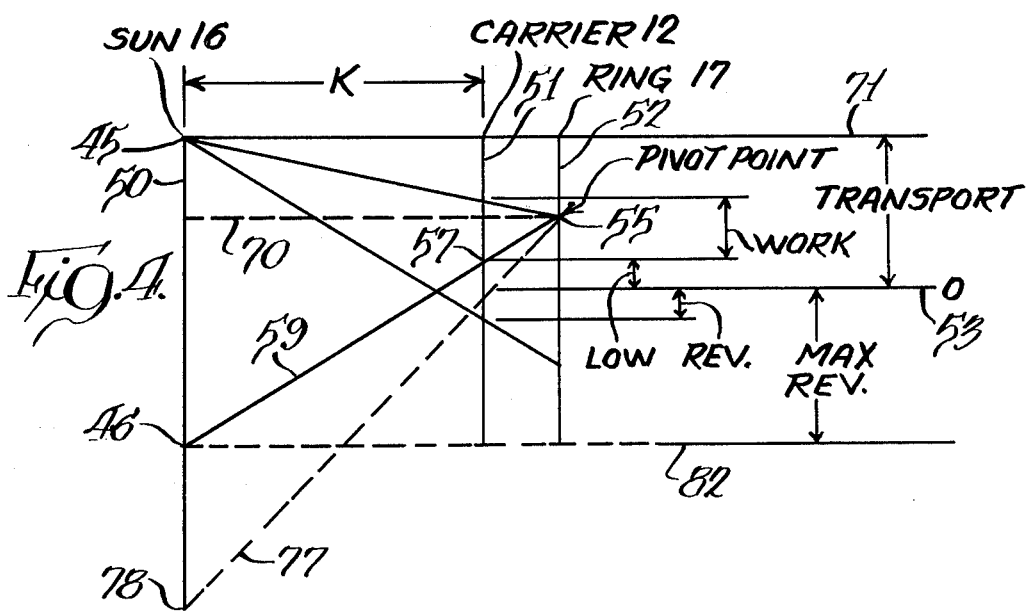
Fig. 4.

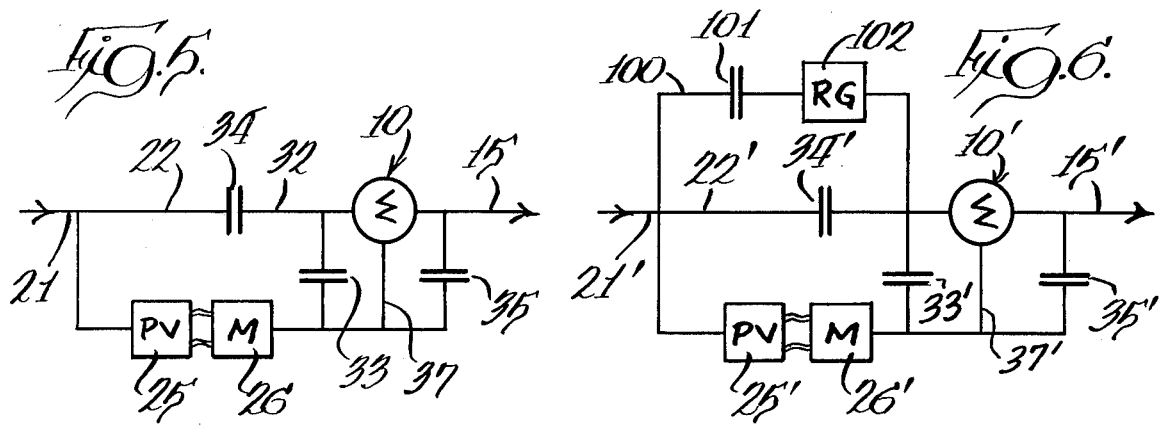
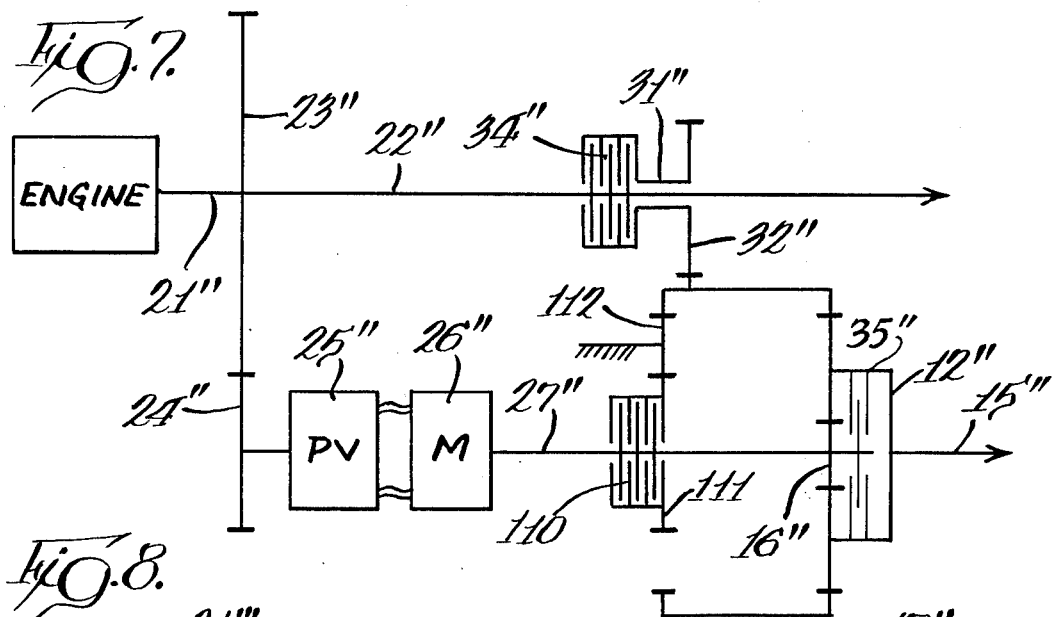
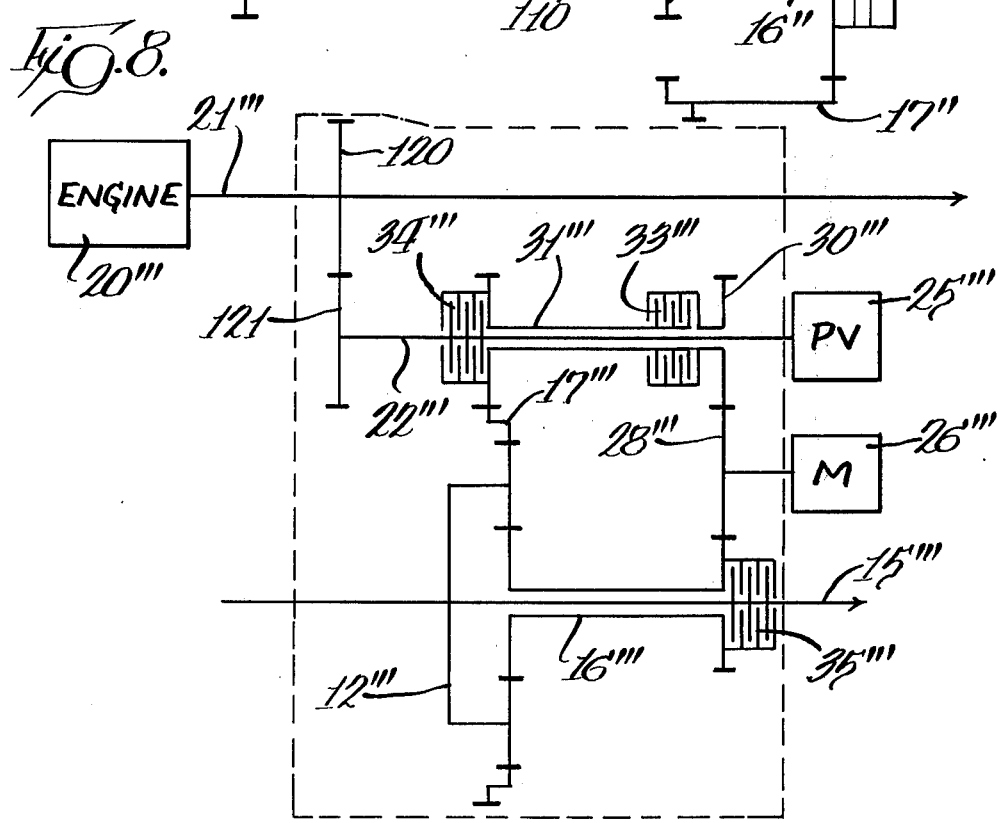

4,019,404

POWER TRANSMISSION

BACKGROUND OF THE INVENTION

This invention pertains to a power transmission for vehicles such as, farm and agricultural tractors and having three modes of operation derived from a simple planetary differential wherein low-and high-speed ranges are provided by a variable speed hydraulic transmission input to the differential and an intermediate work speed range by a hydromechanical operation with inputs to the differential from both the hydraulic transmission and a mechanical drive. More specifically, the hydraulic transmission embodies a variable speed hydrostatic transmission.

A two-mode power transmission with a low-speed hydraulic range and a higher speed hydromechanical range is known, as shown in Gunderson U.S. Pat. No. 3,427,899 and Singer U.S. Pat. No. 3,626,787. It is also known to have a hydromechanical low-speed range of operation for a transmission and a higher speed range which is derived from a variable speed hydraulic transmission which drives the differential. These known systems have not disclosed the full utilization of a simple planetary differential unit to provide a low-speed, high torque hydrostatic drive with an intermediate speed range hydromechanical drive for normal work action of the vehicle and a high-speed hydrostatic drive for mobility.

SUMMARY OF THE INVENTION

A primary feature of the invention is to provide a variable speed power transmission utilizing a simple planetary differential unit with two power paths to the differential unit, with one power path being mechanical and the other including a variable speed hydrostatic transmission and with selectively operable clutches for obtaining three different ranges of output speed from the differential unit to an output shaft, including a low-speed range hydrostatic drive, an intermediate speed range hydromechanical drive, and a high-speed range hydrostatic drive.

More particularly, the hydraulic power path includes a variable speed, hydrostatic transmission with the output thereof drivingly connected to one gear of the differential unit and with either the variable speed hydrostatic transmission or the mechanical input being selectively connectable to another gear of the differential unit for providing said low and intermediate speed ranges, respectively, and with a lock up of the planetary differential to provide the high-speed range of operation through driving of said one gear of the differential unit.

In order to obtain the three sequential speed ranges with possible synchronous shifts and start-up with the prime mover engine running and no rotation in the transmission, the start-up must be hydrostatic with reversibility and torque amplification obtained by counterrotating two gears of the planetary differential unit in speed ratios that result with a positive or negative low-speed output. An intermediate speed range is effected by switching the drive of one of the planetary gears from an input from the variable speed hydrostatic transmission to the mechanical drive from the input shaft and by slowing down the variable speed hydrostatic transmission and, therefore, the hydraulically-driven member of the planetary which is drivingly connected to the variable speed transmission to zero rotation, in effect, grounding the planetary gear element. Speed may further increase in this intermediate range by then rotating the last-mentioned planetary gear element in the opposite direction. The high-speed range of operation is obtained when the planetary gear member drivingly connected to the variable speed hydrostatic transmission attains the forward speed of the other two members of the planetary differential. At this point, the planetary differential can be locked up with release of the mechanical drive from the input shaft to result in the hydrostatic drive for high vehicle speeds.

In obtaining the aforesaid action, the variable speed hydrostatic transmission may be drivingly connected to either the sun gear or the ring gear of the planetary differential and with the alternate connection of either the hydrostatic transmission or the input shaft to the other of said ring and sun gears.

An object of the invention is to provide a power transmission, as described herein, for use with agricultural and industrial tractors as well as other low-speed vehicles which require a high torque, efficient transmission and good vehicle maneuverability.

High efficiency is obtained by employing a sequential range system requiring small hydraulic units and which operate with less hydraulic power during the performance of high load work. The sequential range system provides straight hydraulic power transmission for low and high-speed operation so that good vehicle maneuverability results when "inching" is required or when transporting the vehicle. Additionally, there is multiple usage of differential elements in order to reduce their number and cost.

Another feature of the power transmission disclosed herein is the capability of starting-up the vehicle within any of the three speed ranges and with one embodiment of the invention disclosed herein disclosing the use of an overrunning clutch to prevent the hydraulic transmission from overspeeding during the brief time the vehicle accelerates if the vehicle is directly started in the intermediate speed hydromechanical range.

An additional object of the invention is to provide a power transmission as described herein wherein added reverse movement capability is provided by having an additional input shaft in parallel to the main input shaft which may be clutched into the system and which rotates in an opposite direction to the main input shaft whereby the intermediate hydromechanical speed range may provide for either forward or reverse movement of the vehicle.

Still another object of the invention relates to an embodiment of the invention with the structural components thereof arranged and related for mounting within a "drop box" which is a known housing structure used to lower the physical level of an output shaft in a four-wheel drive vehicle. With the power transmission disclosed herein, it is possible to mount the drive mechanism in the drop box, eliminating the necessity of an additional transmission housing.

BRIEF DESCRIPTION OF THE DRAWING

FIG. 2 is a schematic view of the power transmission shown in FIG. 1;

FIG. 3 is a vehicle speed-element speed graph for the power transmission shown in FIGS. 1 and 2;

FIG. 4 is a speed nomogram of the speed and direction of rotation of the elements of the planetary differential;

FIG. 5 is a diagrammatic view of the power transmission including the embodiment shown in FIGS. 1 and 2;

FIG. 6 is a diagrammatic view of an alternate embodiment of the power transmission;

FIG. 7 is a schematic view of another embodiment of the invention; and

FIG. 8 is a schematic view of an additional embodiment of the invention.

DESCRIPTION OF THE PREFERRED EMBODIMENTS

Figure 1:
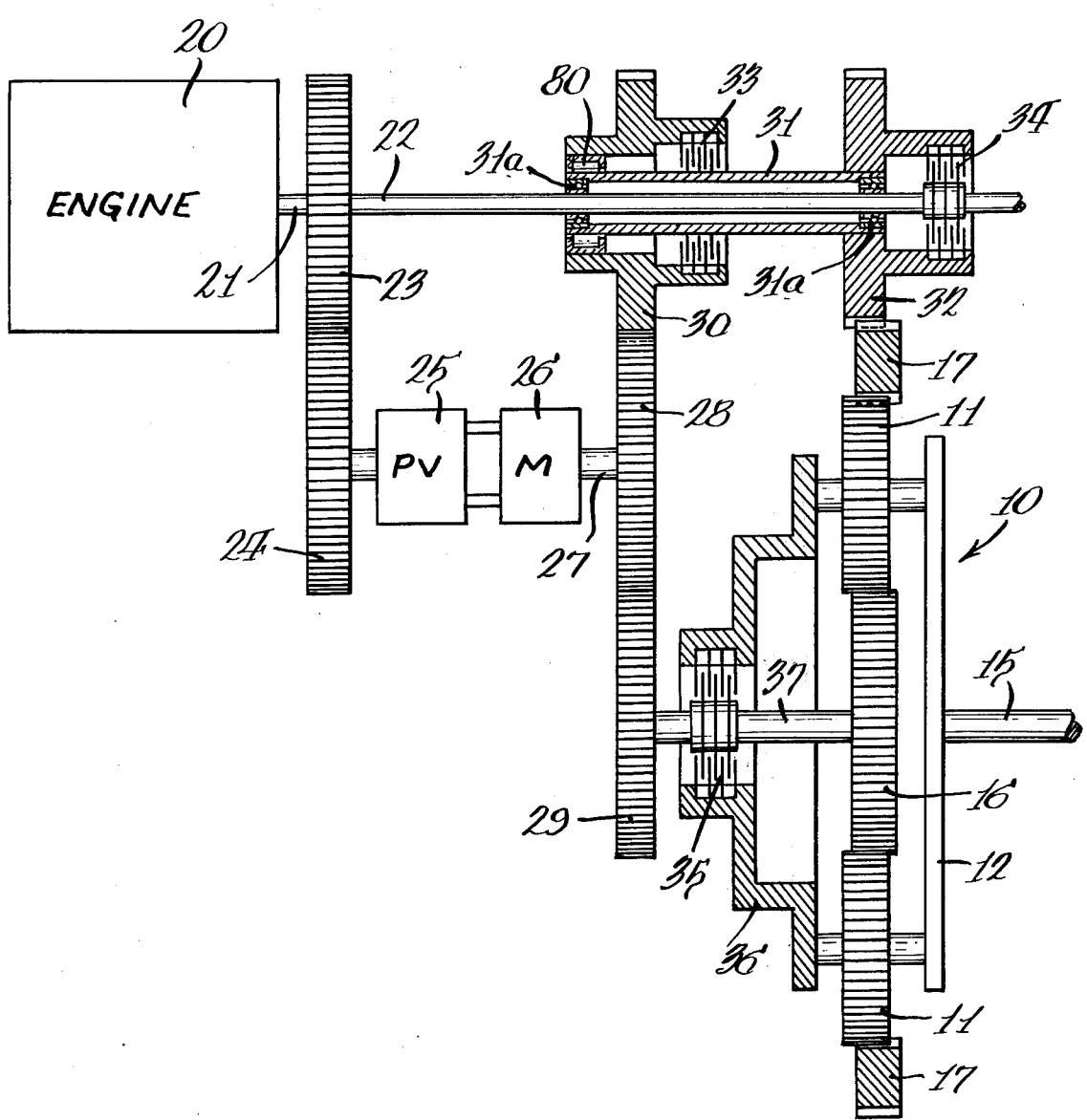
FIG. 1 is a partly schematic illustration of a power transmission according to the present invention.

In the embodiment of the invention shown in FIGS. 1 to 5, a planetary differential unit, indicated generally at 10, has planetary gears 11 on a carrier 12 connected to an output shaft 15. The planetary gears 11 mesh with a sun gear 16 and a surrounding ring gear 17.

An engine 20, such as the prime mover of a vehicle, has a drive shaft 21 which has an extension 22 as an input shaft to the power transmission and which may constitute a power takeoff shaft for the vehicle. A gear 23 on the drive shaft meshes with a gear 24 on the driving shaft of a variable displacement pump 25 of a variable speed hydraulic transmission which, more particularly, is a variable speed hydrostatic transmission, as known in the art. The pump 25 is in circuit with a motor 26 of the hydraulic transmission. The pump 25 has a swashplate movable to either side of a zero displacement position to direct pressure fluid in either of two directions to the motor to cause either forward or reverse rotation of the motor. A motor driven shaft 27 has a gear 28 meshing with a pair of gears 29 and 30.

The gear 30 is tubular and rotatably mounted upon a tubular sleeve 31 rotatably mounted on the input shaft 22 by bearings 31a. The tubular sleeve 31 has an external gear 32 which meshes with the ring gear 17 of the planetary differential and enables either a mechanical drive input or a hydraulic drive input to the differential through the drive of the gear 32 to the ring 17.

A low-speed hydraulic drive and, more particularly, hydrostatic drive is obtained through operation of the motor 26 which drives the sun gear 16 and which, through gears 28 and 30, also drives the tubular sleeve 31 and gear 32 to rotate the ring 17. This latter drive connection is completed by energization of a clutch 33 which has coacting elements on and clutches the tubular gear 30 to the tubular sleeve 31.

As more fully described hereinafter, a shift from the low-speed range to an intermediate speed hydromechanical drive range is obtained by release of the clutch 33 and engagement of a clutch 34 which has coacting parts on and clutches the tubular gear 32 to the input shaft 22 whereby the engine, rather than the motor 26, drives the ring 17 of the planetary differential. Advance to the high-speed hydraulic drive range is obtained by release of the clutch 34 and engagement of the clutch 35 which has coacting parts on and clutches a sun gear drive shaft 37 to a part 36 of the planetary gear carrier. This locks up the differential to have a direct drive of the output shaft 15 from the hydrostatic transmission motor shaft 27.

The operation of the power transmission shown in FIGS. 1 and 2 is clearly brought out by the speed graph of FIG. 3 and the speed nomogram of FIG. 4. In considering the speed graph, it should be noted that the speeds and speed ranges identified therein are for illustrative purposes only and the disclosure of the power transmission is not limited to the particular speeds and speed ranges identified in FIG. 3. In FIG. 3, the base line indicates vehicle speeds from 0 to 20. In FIG. 3, the lines 40, 41 and 42 represent the speed of rotation (N) of the sun gear ($N_S$), the ring gear ($N_R$), and the carrier ($N_C$), respectively, of the planetary differential in the low-speed range hydrostatic operation. The maximum speeds of rotation of the sun gear 16 in opposite directions are indicated at points 43 and 44 in FIG. 3. These speeds correspond to points 45 and 46 in the speed nomogram of FIG. 4. In FIG. 4, the speed range of the sun gear 16 is indicated by a line 50, the speed range of the carrier is indicated by a line 51, and the speed range of the ring is indicated by a line 52. These ranges also extend to either side of a zero speed line 53 to show forward and reverse rotation. The distance K is equal to the diameter of the ring gear 17 divided by the diameter of the sun gear 16. This is the effective ratio of the differential 10.

With the vehicle stationary and with the engine running and no rotation in the transmission, because the pump 25 is at zero displacement, the sun gear 16, the carrier 12, and the ring 17 are all stationary. Engagement of the clutch 33 connects the hydraulic power path to the ring gear 17. The variable displacement pump 25 is then operated from zero displacement to start acceleration of the sun gear 16 toward the point 46 in the illustration of FIG. 4 and which is represented by line 40 in FIG. 3. The line 40 shows that the vehicle may accelerate to a speed of approximately 3 m.p.h. for the vehicle when the sun gear reaches a speed indicated by point 44 in FIG. 3. At the same time that the sun gear 16 is increasing in speed in a direction of rotation toward the point 46 of FIG. 4, the ring gear 17 is rotating in the opposite direction, with the speed thereof moving toward a point 55 on the line 52 of FIG. 4. This is the pivot point for the ring gear and corresponds to the speed of the ring gear as driven by the engine through the input shaft 22 when the clutch 34 is engaged. This pivot point is also shown in FIG. 3 at 56. The movements of the sun gear and ring gear to maximum speeds of rotation in the low-speed range brings the carrier 12 to a speed, indicated by a point 57 on line 51 of FIG. 4, and a point 58 on line 42 in FIG. 3, which indicates maximum vehicle speed in the low-speed range. As is known in the use of the speed nomogram of FIG. 4, this condition of the planetary differential may be indicated by a straight line 59 drawn through points 46, 55 and 57. These points indicate the speeds and the directions of rotation of the three elements with respect to the "0" line 53. The top of the low-speed range is indicated by a line 60 spaced above a base line 61 in FIG. 3. At start-up, there can be reverse operation of the power transmission in the low-speed range as seen by rotation of the sun gear 16 in a direction toward the point 43 in FIG. 3 (point 45 in FIG. 4) with the resulting movement of the ring and carrier being represented by extension of lines 41 and 42 to the left of the 0 speed in FIG. 3. This is accomplished by opposite displacement of the pump 25.

The clutch shift to the intermediate speed range can be done synchronously, since at the top of the low-speed range the ring gear 17 is rotating at its pivot point 55. Release of the clutch 33 disconnects the hydraulic power path to the ring gear 17 and energization of the clutch 34 connects the mechanical path through drive shaft 22 to the ring gear 17. The speed and direction of rotation of the ring gear at the pivot point 55 is the same as that imparted to the ring gear 17 through gear 32, so that the shift is synchronous. In intermediate speed range, the speed of the ring gear is constant as shown by a horizontal extension 41a of the line 41 in FIG. 3. Increase in speed results from a reduction in displacement of the hydrostatic transmission pump 25 to zero to reduce the speed of rotation of the sun gear 16 to 0. This is represented by a line 66 in FIG. 3 with speed change from point 44 to point 65. At such time, The carrier 12 driving the output shaft 15 is rotating ($N_C$) to provide a vehicle speed of approximately 7 m.p.h. At this time, the sun gear is, in effect, grounded and then the direction of rotation thereof is reversed to have the sun increasingly rotate in a direction indicated by the line 50 in FIG. 4 is moving from the 0 line 53 toward the point 45 and toward point 62 in FIG. 3. The maximum speed obtainable in the intermediate speed range is approximately 10 m.p.h. as indicated by point 63 on line 66 in FIG. 3 and is obtained when the sun gear 16 is rotating at a speed indicated by point 45 on line 50 in FIG. 4.

A transmission to high speed is normally obtained at a vehicle speed of approximately 8–10 m.p.h. when the sun gear is rotating at any speed between points 62 and 63 on line 66 in FIG. 3. At point 62, it will be noted that line 66 intersects with line extension 41a representing the speed of the ring gear and line 42 representing the speed of the carrier. The common speed of all three differential elements is indicated by a broken line 70 in FIG. 4 which intersects the lines 50, 51, and 52 at the same level. With this condition, the clutch 34 may be disengaged and clutch 35 engaged to lock up the differential and have the drive of the output shaft 15 directly controlled by the adjustment of the pump 25 of the hydrostatic transmission. The speed of rotation of the sun gear 16 can then be increased to the point 45 on line 50 of FIG. 4 which brings the ring 17 and carrier 12 up to the same speed as indicated by a solid line 71 extending across the top of FIG. 4.

The shift to the high-speed range can also occur with the sun gear rotating at a speed indicated by point 45. Upon shift, the ring and carrier will move up to the speed indicated by the line 71.

With the power transmission disclosed, it is possible to initially start the vehicle in any three of the speed ranges. The starting in the low-speed range has been described. It is also possible to start in the high-speed range, since none of the planetary elements are rotating and, in this condition, clutch 35 is engaged to lock up the planetary. The speed of the planetary carrier and the output shaft 15 increases to a maximum speed at a point 75 with the planetary elements moving in unison as represented by a broken line 76 in FIG. 3. The broken line 76 should be an extension of line 42 but is slightly offset for clarity. In this operation, the pump 25 has its displacement controlled to move the sun gear from zero speed to a speed indicated by point 45.

In starting the vehicle in the intermediate hydromechanical speed range, there is a resulting "jump" start since there is immediate input of engine speed to the stationary ring gear 17 through engagement of the clutch 34. This drives the ring gear to the pivot point, indicated at point 55 in FIG. 4. With the carrier initially being at 0 speed of rotation because the vehicle is stationary, a broken line 77 in FIG. 4 shows the substantially instantaneous speed conditions of the ring and carrier. The line 77 also shows that the sun gear 16 should immediately rotate at a speed identified at point 78 which is approximately twice the normal maximum speed of the sun gear. Suitable operator controls may be provided to avoid this jump start or, as shown in FIGS. 1 and 2, an overrunning clutch 80 is connected between the tubular sleeve 31 and the tubular gear 30 whereby upon the occurrence of a jump start the gear 30 is locked to the tubular sleeve 31 and the input shaft 22 whereby the gear 28 connected to the drive shaft 27 of the hydrostatic transmission motor 26 can only operate at a speed less than that derived from rotation of the sun gear 16 at point 78. There will be a lag in engine speed which reduces the speed of both the sun gear 16 and the ring gear 17. The overrunning clutch 80 also prevents overspeed if the power transmission is manually shifted to hydromechanical operation intermediate speed while in the hydrostatic fluid power range.

With the power transmission as disclosed in FIGS. 1 to 4, it is possible to have good maneuverability from control of the hydrostatic transmission at both low speed and high speed, with the low-speed range providing a high torque output. It is also possible to have a hydromechanical drive in a work speed range and with the actual speed in this range being determined by the displacement of the pump 25 of the hydrostatic transmission.

The embodiment of FIGS. 1 to 4 has shown a permanent drive connection between the hydrostatic transmission and the sun gear, with an optional connection of the hydrostatic transmission to the ring gear through the clutch 33. It is possible to have the permanent connection to the ring gear 17 and with the optional connection of the hydrostatic transmission to the sun gear through clutch 33 as well as the optional connection of the input shaft thereto through the clutch 34. FIG. 5 illustrates these equivalent arrangements with the planetary differential 10 indicated generally and with the alternate possibilities being indicated by non-limiting designation of the connections of the gear 32 and shaft 37 to the planetary differential.

In the embodiment of FIGS. 1 to 4, the reverse operation in the low-speed range has been described, with the sun gear moving toward point 43 in FIG. 3. It is also possible to have reverse operation in the high-speed hydrostatic range wherein the clutch 35 is energized to lock up the planetary whereby rotation of the sun gear 16 toward point 44 of FIG. 3 (point 46 of FIG. 4) and with the carrier and ring gear locked thereto brings the carrier and ring to a maximum reverse speed line 82 of FIG. 4.

In certain uses of the power transmission, as for an industrial tractor, full reversability is desired in all modes and, in order to accomplish this, an added mechanical power path to the planetary differential may be provided, as shown by the diagrammatic illustration of FIG. 6 wherein the same structure as shown in the embodiment of FIGS. 1 to 4 is given the same reference numeral with a prime affixed thereto. The alternate mechanical power path is provided by a branch input shaft 100 in parallel with the input shaft 22' and having a fourth clutch 101 and a reverse gear box 102. When it is desired to operate in reverse in the intermediate speed hydromechanical range of operation, the clutch 101 is engaged, instead of the clutch 34', whereby a direction of rotation is imparted to the ring gear opposite from that imparted by the input shaft 22' when the clutch 34' is engaged. As pointed out in connection with FIG. 5, the mechanical power inputs may be either to the ring gear 17' or to the sun gear 16' within the scope of the invention.

Another embodiment of the invention is shown in FIG. 7 which provides the same three speeds of operation as the embodiment of FIGS. 1 to 4 and with similar structure being given the same reference numeral with a double prime affixed thereto. In this embodiment, the low-speed hydrostatic range is derived from opposite rotation of the sun gear 16" and the ring gear 17" by engagement of a clutch 110, generally corresponding in function to the clutch 33 of FIGS. 1 and 2 and which clutches the motor output shaft 27" to gear 111 which meshes with a gear 112. The ring gear 17" has two sets of gear teeth to not only mesh with the planetary gears 11 of the differential as in the embodiment of FIGS. 1 to 4, but also to mesh with the gear 112 whereby the hydrostatic transmission drives both the sun gear and the ring gear in the low-speed range of operation.

In certain existing systems, such as four-wheel drive vehicles, there is currently a transmission housing and also a drop box which is a housing with gears and functions to lower the physical level of an output shaft which transmits power to the wheels from the transmission. With the use of the simple planetary differential and small hydraulic components possible with the system disclosed herein, it is possible to have the power transmission substantially within the drop box eliminating the necessity of two housings.

This embodiment is shown in FIG. 8 wherein the outline of the drop box is shown in broken line. The structure of this embodiment corresponding to that of the embodiment of FIGS. 1 to 4 is given the same reference numerals with a triple prime affixed thereto. In this embodiment, the input shaft 22''' is offset from the engine drive shaft 21''' and driven thereby through meshing gears 120 and 121 on the two shafts. The pump 25''' is connected directly to the input shaft 22''' and the clutches 33''' and 34''' are associated with the input shaft 22''' similarly to the clutches 33 and 34 and their association with the input shaft 22 in FIG. 1. The ring gear 17''' is driven by either mechanical power or hydraulic power through engagement of one or the other of the clutches 33''' and 34'''. The sun gear 16''' has two sets of gear teeth of differing diameter whereby the sun gear meshes with the planetary gears of the planetary differential carrier 12''' as well as meshing with the output gear 28''' associated with the hydrostatic transmission motor 26''' . In this embodiment, the output shaft 15''' extends outwardly in both directions from the planetary differential whereby it may extend to a pair of wheels of a vehicle and at a lower level than the engine drive shaft 21'''. The nonaligned arrangement of the pump 25''' and motor 26''' as well as the relation of the other components enables mounting of the shaft, gear and clutch components of the power transmission within the conventional drop box to accomplish the function of the mechanism normally used in the drop box and avoid the use of a transmission housing.

I claim:

1. A continuously variable power transmission utilizing a differential unit having a ring gear, a sun gear, and a carrier connected to the output of the transmission, a power input shaft, a variable speed hydrostatic transmission driven by said power input shaft and rotatively fixed to one of said gears, and means for controlling the drive relation between said differential gears including means for selective connection of the hydrostatic transmission to the other of said differential unit gears to provide a low-speed range hydrostatic drive, means for selectively connecting the power input shaft to the other of said differential unit gears for an intermediate speed range hydromechanical drive, and means for selectively locking up the differential for a high-speed range hydrostatic drive.

2. A power transmission as defined in claim 1 wherein said controlling means includes three clutches.

3. A power transmission as defined in claim 2 wherein said three clutches include a first clutch to selectively connect said power input shaft to said other gear, a second clutch to connect said hydrostatic transmission to said other gear and a third clutch to connect said one gear and the carrier.

4. A power transmission as defined in claim 3 wherein said one gear is the sun gear and the other gear is the ring gear.

5. A power transmission as defined in claim 3 and including an overrunning clutch to prevent overspeeding of said hydrostatic transmission if said first clutch is engaged when the carrier is not rotating.

6. A power transmission as defined in claim 2 including an additional power input shaft having a rotation opposite to said power input shaft and a fourth clutch for selectively connecting said additional power input shaft to said other differential unit gear.

7. A power transmission including an input shaft, an output shaft, a differential unit with first and second gears and a third gear drivingly connected to the output shaft, two power paths between said input shaft and the differential unit with one of said paths including a first clutch between the input shaft and the differential unit for selectively connecting the input shaft to one of said first and second gears, the other power path including a variable speed hydraulic transmission connected to said input shaft and having an output drivingly connected to the other of said first and second gears and a second clutch selectively connecting the hydraulic transmission to said one of the first and second gears, and a third clutch for selectively connecting the third gear to one of said first and second gears to lock up the differential unit, said differential unit having an effective ratio whereby a low-speed hydraulic drive is obtained by engagement of said second clutch resulting in said first and second gears rotating in opposite directions and with the hydraulic transmission increasing in output speed in one direction, an intermediate speed hydromechanical drive is obtained by engagement of said first clutch with increased speed as the hydraulic transmission decreases speed in one direction to zero speed and then increases speed in the opposite direction, and a high-speed hydraulic drive is obtained by engaging said third clutch when the first and second gears are at the same speed and with increased speeds as the hydraulic transmission increases speed in said opposite direction.

8. A power transmission as defined in claim 7 wherein said hydraulic transmission comprises a pump and a motor, a driven shaft extending from the motor and drivingly connected to the other of said first and second gears, a drive sleeve on said input shaft geared to said one of the first and second gears and with said first clutch operable between the input shaft and the drive sleeve to provide said one power path, and an additional drive train between said motor-driven shaft and said one of the first and second gears including said second clutch whereby when the second clutch is engaged, said first and second gears rotate in opposite directions.

9. A power transmission as defined in claim 8 wherein said input shaft is offset from an engine drive shaft and geared thereto and the output shaft extends outwardly in two directions from the differential unit.

10. A power transmission as defined in claim 8 wherein the other of said differential gears is the sun gear of the differential, said sun gear having a tubular body with said output shaft extending therethrough, and two sets of gear teeth on said sun gear with one set meshing with the third gear of the differential and the other set being part of the drive train from said motor-driven shaft.

11. A power transmission as defined in claim 7 wherein an engine drive shaft and the power transmission output shaft are offset and parallel, said input shaft being positioned therebetween and drivingly connected to the engine drive shaft, said hydraulic transmission having a motor with a drive shaft driving a gear, and the other of said differential gears being a sun gear which is tubular and surrounds said output shaft, and external gear teeth on said sun gear meshing with the third gear of the differential and with the gear driven by the motor drive shaft.

12. A power transmission as defined in claim 7 including an auxiliary input shaft rotatable in a direction opposite to said input shaft, and a fourth clutch operable in place of said first clutch to drive said one of the first and second gears in an opposite direction of rotation for a reverse drive in said hydromechanical drive.

13. A power transmission including an input shaft, an output shaft, a differential unit with first and second gears and a third gear drivingly connected to the output shaft, two power paths between said input shaft and the differential unit with one of said paths including a first clutch between the input shaft and the differential unit for selectively connecting the input shaft to one of said first and second gears, the other power path including a variable speed hydrostatic transmission with a variable displacement pump connected to the input shaft and a motor drivingly connected to the other of said first and second gears for rotation thereof in one direction and a second clutch between said motor and differential unit for selectively connecting the hydrostatic transmission motor to said one of the first and second gears for rotation thereof in a direction opposite to said one direction, and a third clutch for selectively connecting the third gear to one of said first and second gears to lock up the differential unit, said differential unit having an effective ratio whereby a low-speed hydrostatic drive is obtained by engagement of said second clutch with said first and second gears rotating in opposite directions and with the hydrostatic transmission increasing in output speed in one direction, an intermediate speed hydromechanical drive is obtained by engagement of said first clutch with increased speed as the variable displacement pump decreases displacement in one direction to zero and then increases displacement in the opposite direction, and a high-speed hydrostatic drive is obtained by engaging said third clutch when the first and second gears are at the same speed and with increased speeds as the hydraulic transmission increases displacement in said opposite direction.

14. A power transmission as defined in claim 13 wherein said one gear is a ring gear and the other gear is a sun gear and including a driven shaft extending from the motor and drivingly connected to the sun gear, a drive sleeve on said input shaft geared to said ring gear and with said first clutch operable between the input shaft and the drive sleeve to provide said one power path, and an additional drive train between said motor-driven shaft and said ring gear including said second clutch whereby when the second clutch is engaged, said sun and ring gears rotate in opposite directions.

15. A power transmission as defined in claim 14 wherein said input shaft is offset from an engine drive shaft and geared thereto and the output shaft extends outwardly in two directions from the differential unit.

16. A power transmission as defined in claim 14 wherein said sun gear is tubular with said output shaft extending therethrough, and gear teeth on said sun gear meshing with the third gear of the differential and also being part of the drive train from said motor-driven shaft.

17. A power transmission as defined in claim 14 including an auxiliary input shaft rotatable in a direction opposite to said input shaft, and a fourth clutch operable in place of said first clutch to drive said ring gear in a direction of rotation opposite to that rotation imparted when the first clutch is engaged.

18. A power transmission as defined in claim 13 wherein an engine drive shaft and the power transmission output shaft are offset and parallel, said input shaft being positioned therebetween and drivingly connected to the engine drive shaft, said hydrostatic transmission motor driving a gear, said sun gear being tubular and surrounding said output shaft, and two sets of external gear teeth on said sun gear with one set meshing with the third gear of the differential and the other set meshing with the motor-driven gear.

19. A power transmission including an input shaft, an output shaft, a differential unit with ring and sun gears and planetary gears with a carrier drivingly connected to the output shaft, two power paths between said input shaft and the differential unit with one of said paths including a first clutch between the input shaft and the ring gear for selectively connecting the input shaft to the ring gear, the other power path including a variable speed hydrostatic transmission connected to the input shaft and having an output drivingly connected to the sun gear and a second clutch selectively connecting the hydrostatic transmission to said ring gear, and a third clutch for selectively connecting the planetary gears to said sun gear to lock up the differential unit, said differential unit having an effective ratio whereby a low-speed hydrostatic drive is obtained by engagement of said second clutch with said ring and sun gears rotating in opposite directions and with the hydrostatic transmission increasing in output speed in one direction, an intermediate speed hydromechanical drive is obtained by engagement of said first clutch with increased speed as the hydrostatic transmission decreases speed in one direction to zero speed and then increases speed in the opposite direction, and a high-speed hydrostatic drive is obtained by engaging said third clutch when said ring and sun gears are at the same speed and with increased speeds as the hydraulic transmission increases speed in said opposite direction.

20. A power transmission as defined in claim 19 wherein said hydrostatic transmission comprises a variable displacement pump and a motor, a driven shaft extending from the motor and drivingly connected to the sun gear, a drive sleeve rotatable on said input shaft geared to said ring gear and with said first clutch operable between the input shaft and the drive sleeve to provide said one power path, and an additional drive train between said motor-driven shaft and said ring gear including said second clutch, a gear driven by the second clutch and a second gear engaged between the clutch-driven gear and the ring gear.

21. A power transmission wherein an engine drive shaft and a power transmission output shaft are offset from each other, an input shaft to the power transmission positioned between the engine drive shaft and said output shaft, said input shaft being drivingly connected to said engine drive shaft, a differential unit with a ring gear, a tubular sun gear surrounding the output shaft and planetary gears with a carrier drivingly connected to the output shaft, two power paths between said input shaft and the differential unit with one of said paths including a first clutch for selectively connecting the input shaft to the ring gear, the other power path including a variable speed hydrostatic transmission having an output gear drivingly connected to the sun gear and a second clutch selectively connecting the hydrostatic transmission to said ring gear, and a third clutch for locking up the differential unit, said differential unit having an effective ratio whereby a low-speed hydrostatic drive is obtained by engagement of said second clutch with said ring and sun gears rotating in opposite directions and with the hydrostatic transmission increasing in output speed in one direction, an intermediate speed hydromechanical drive is obtained by engagement of said first clutch with increased speed as the hydrostatic transmission decreases speed in one direction to zero speed and then increases speed in the opposite direction, and a high-speed hydrostatic drive is obtained by engaging said third clutch when said ring and sun gears are at the same speed and with increased speeds as the hydraulic transmission increases speed in said opposite direction.

* * * * *